United States Patent
Morimura

(10) Patent No.: US 8,527,128 B2
(45) Date of Patent: Sep. 3, 2013

(54) VEHICLE CONTROL APPARATUS AND VEHICLE CONTROL METHOD

(75) Inventor: Junichi Morimura, Suntoh-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/281,857

(22) Filed: Oct. 26, 2011

(65) Prior Publication Data

US 2012/0109480 A1    May 3, 2012

(30) Foreign Application Priority Data

Oct. 27, 2010   (JP) ................................. 2010-241125

(51) Int. Cl.
   *G06F 7/00*   (2006.01)

(52) U.S. Cl.
   USPC ............... 701/22; 701/70; 701/75; 180/65.31

(58) Field of Classification Search
   USPC ............................ 701/22, 70, 75; 180/65.31
   See application file for complete search history.

(56) References Cited

U.S. PATENT DOCUMENTS 7,055,635 B2 * 6/2006 Itoh et al. .................... 180/65.25

FOREIGN PATENT DOCUMENTS

| JP | H07-310566 | * | 5/1994 |
| JP | 08-099564 | | 4/1996 |
| JP | H11-107805 | * | 9/1997 |
| JP | 2000-134713 A | * | 5/2000 |
| JP | 2002-234340 | | 8/2002 |
| JP | 2005-313831 | | 11/2005 |
| JP | 2007-032389 | | 2/2007 |
| WO | WO 2011/036810 A1 | | 3/2011 |

OTHER PUBLICATIONS

"BMW to Offer Intelligent Alternator Control/Regenerative Braking on Non-Hybrid 5-Series", GreenCarCongress.com, Jan. 12, 2007, http://www.greencarcongress.com/2007/01/bmw_to_offer_in.html.*
"BMW Introduces Intelligent Alternator Control with Regenerative Braking; Reduces Fuel Consumption by About 4%", GreenCarCongress.com, Sep. 29, 2006, http://www.greencarcongress.com/2006/09/bmw_introduces_.html.*
"BMW Reduces Fuel Consumption 4%—with a new Alternator", Sep. 29, 2006, http://blog.fuelclinic.com/2006/09/29/bmw-reduces-fuel-consumption-4-with-a-new-alternator/.*

* cited by examiner

*Primary Examiner* — Mary Cheung
*Assistant Examiner* — Brian P Sweeney
(74) *Attorney, Agent, or Firm* — Oblon, Spivak, McClelland, Maier & Neustadt, L.L.P.

(57) ABSTRACT

A vehicle control apparatus is provided with a power generator driven by a torque transmitted between an internal combustion engine and a drive wheel. The vehicle control apparatus executes a torque control that smoothly changes a torque at the drive wheel by changing a torque of the power generator during deceleration of the vehicle. The vehicle control apparatus determines whether a factor restricting the torque of the power generator is in effect during the deceleration of the vehicle, and controls a manner of the torque control to be different between when the restricting factor is in effect and when the restricting factor is not in effect.

5 Claims, 4 Drawing Sheets

VEHICLE CONTROL APPARATUS AND VEHICLE CONTROL METHOD

INCORPORATION BY REFERENCE

The disclosure of Japanese Patent Application No. 2010-241125 filed on Oct. 27, 2010 including the specification, drawings and abstract is incorporated herein by reference in its entirety.

BACKGROUND OF THE INVENTION

1. Field of the Invention

The invention relates to a control apparatus and a control method that control deceleration of a vehicle or braking force on the vehicle when the vehicle is decelerated. In particular, the invention relates to a control apparatus and a control method that execute the same control so as to prevent an excessive change in the braking force even upon occurrence of an event that may cause a change in torque, such as releasing of a lockup clutch and discontinuance of fuel-cut control.

2. Description of Related Art

An internal combustion engine that produces drive force through combustion of fuel, such as a gasoline engine, starts running on its own by fuel supply while the internal combustion engine is driven at a certain engine speed or higher. When a vehicle incorporating an internal combustion engine is being decelerated, the drive wheels and the internal combustion engine are connected to each other such that torque is transmittable between them, so that the internal combustion engine is forcibly rotated by the inertial force of the traveling vehicle. Then, in response to the speed of the internal combustion engine becoming equal to or higher than a predetermined speed, the supply of fuel is suspended ("fuel-cut" is performed). Then, the fuel supply is resumed in response to the speed of the internal combustion engine reaching the speed at which to resume the fuel supply (i.e., the speed at which to discontinue the fuel-cut) with a decrease in the vehicle speed. Such control for suspending fuel supply is often called "fuel-cut control", and it is normally adapted to, in order to suspend the fuel supply as long as possible for further improvement of the fuel economy, increase the transmission speed ratio gradually as the vehicle speed decreases, so as to maintain the speed of the internal combustion engine higher than the engine speed at which to resume the fuel supply while preventing the braking force from becoming excessive.

Torque converters are widely used to facilitate the control for starting the vehicle and the control for shifting the transmission. Most torque converters are provided with a lockup clutch that mechanically, and directly, connect the pump impeller and the turbine runner with each other in order to minimize a decrease in the drive force transmission efficiency, which is caused by relative rotations of the pump impeller and turbine runner (often called "slipping"). As long as the lockup clutch is applied, the connection between the drive wheels and the internal combustion engine is more "direct", making it easier to maintain the speed of the internal combustion engine at a desired speed or in a desired speed range. For this reason, normally, the lockup clutch is applied during the fuel-cut control.

However, a change in torque may occur as a result of the lockup clutch being applied, causing vibrations that propagate to the vehicle body and then are felt by the occupants including the driver, and further such vibrations increase booming noises, degrading the ride comfort. To counter this, normally, the lockup clutch is applied on the condition that the vehicle speed is equal to or higher than a predetermined speed. Thus, the lock-up clutch is released when the vehicle speed has been reduced to the predetermined speed in response to the driver's deceleration operation or under given deceleration control. However, this results in a decrease in the capacity of torque transmission between the internal combustion engine and the drive wheels, thus, a decrease in the braking force obtained from the internal combustion engine. Such a change in the braking force may act as "shock". Japanese Patent Application Publication No. 2002-234340 describes an invention designed to reduce such a shock occurring as a result of the lockup clutch being released during deceleration of the vehicle.

More specifically, Japanese Patent Application Publication No. 2002-234340 describes an apparatus that is structured to extend the duration of fuel-cut control for suspending the fuel supply to the internal combustion engine, by maintaining the engine speed at a relatively high speed by applying the lockup clutch during deceleration of the vehicle. This control is aimed at maintaining the engine speed higher than the speed at which to resume the fuel supply. To this end, the apparatus described in Japanese Patent Application Publication No. 2002-234340 reduces, during the fuel-cut control with the lockup clutch applied, the load of the air conditioner to minimize a decrease in the engine speed. According to the apparatus described in Japanese Patent Application Publication No. 2002-234340, further, the vehicle speed at which to release the lockup clutch is set such that the decrease in deceleration, which occurs as a result of the lockup clutch being released, does not cause uncomfortable feelings.

As mentioned above, the apparatus described in Japanese Patent Application Publication No. 2002-234340 sets the lockup clutch release vehicle speed such that the deceleration does not cause uncomfortable feelings. Thus, the lockup clutch release vehicle speed is relatively high, and this may result in a shorter duration of the fuel-cut control, ending up reduced fuel economy improvement. Further, in a case where an accessory component mounted on the engine is used to control the braking force, if the torque of the accessory component or the control of the same torque is restricted for some reason, the braking torque may fail to be controlled as required, leaving a possibility of occurrence of "shock". Sufficient study has not been conducted on control for coping with such a situation, and thus it is necessary to develop a new technique.

SUMMARY OF THE INVENTION

The invention provides a vehicle control apparatus and a vehicle control method that achieve a smooth change in deceleration force or deceleration by controlling, as the situation demands, a power generator capable of changing the torque transmitted between an internal combustion engine and a drive wheel.

The first aspect of the invention relates to a vehicle control apparatus. The vehicle control apparatus is provided with a power generator driven by a torque transmitted between an internal combustion engine and a drive wheel. The vehicle control apparatus executes a torque control that smoothly changes a torque at the drive wheel by changing a torque of the power generator during deceleration of the vehicle. The vehicle control apparatus determines whether a factor restricting the torque of the power generator is in effect during the deceleration of the vehicle, and controls a manner of the torque control to be different between when the restricting factor is in effect and when the restricting factor is not in effect. It is to be understood that the phrase "controls a manner of the torque control to be different" is intended to encompass permitting execution of the torque control depending upon whether the restricting factor is in effect.

The vehicle control apparatus described above may be such that the determination as to whether the restricting factor is in effect includes a determination as to whether the power generator is required to continue power generation.

The vehicle control apparatus described above may be such that the determination as to whether the power generator is required to continue the power generation is based on an accumulated value of current generated through the power generation or an amount of power stored in a power storage connected to the power generator.

The vehicle control apparatus described above may be such that the torque control is executed when a state of a lockup clutch of a fluid coupling provided between the internal combustion engine and the drive wheel is changed from an applied state to a released state.

The second aspect of the invention relates to a method for controlling a vehicle having a power generator driven by a torque transmitted between an internal combustion engine and a drive wheel. The method includes executing a torque control that smoothly changes a torque at the drive wheel by changing a torque of the power generator during deceleration of the vehicle, wherein whether a factor restricting the torque of the power generator is in effect during the deceleration of the vehicle is determined, and a manner of the torque control is controlled to be different between when the restricting factor is in effect and when the restricting factor is not in effect. It is to be understood that the phrase "a manner of the torque control is controlled to be different" is intended to encompass permitting execution of the torque control depending upon whether the restricting factor is in effect.

According to the first and second aspects of the invention, the torque for decelerating the vehicle is smoothly changed by controlling the torque of the power generator. The torque of the power generator changes depending upon the amount of power generated. According to the first and second aspects of the invention, therefore, the manner of the torque control is controlled to be different between when the factor restricting the torque of the power generator (e.g., a restriction or limit on the power generation amount) is in effect and when the same factor is not in effect. The factor restricting the torque of the power generator may be a requirement for continuing the power generation, which can be known as, for example, a shortage of the accumulated current value or a shortage of the amount of power stored in the power storage. When such a restricting factor is in effect, for example, the power generation by the power generator is continued, so that the torque used to drive the power generator acts as braking force on the vehicle. In this case, therefore, the power generator is controlled in a manner different from when such braking torque is not produced, so as to achieve a smooth change in the torque at the drive wheel. Accordingly, by executing such control in a situation where the lockup clutch is applied and thereafter released with a decrease in the vehicle speed, a shock that may occur due to the shift of the state of the lockup clutch between the applied state and the released state can be prevented or reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 4:
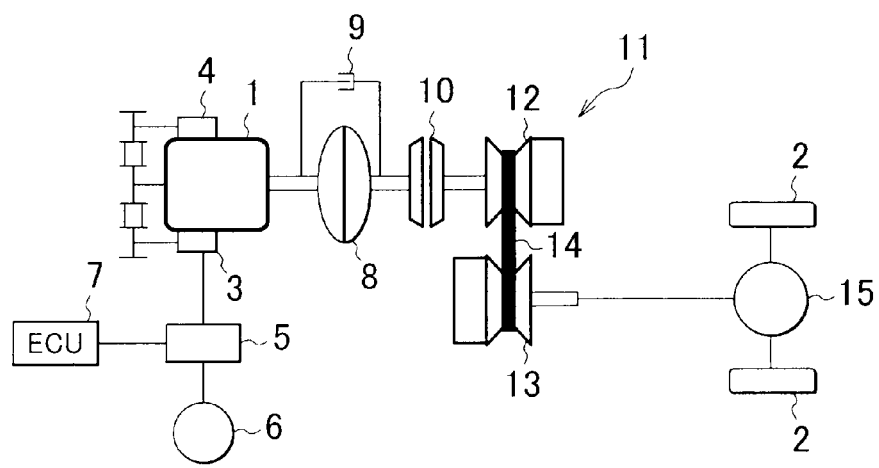
FIG. 4 is a view schematically showing the configuration of a drive system of a vehicle according to the example embodiment of the invention.

Hereinafter, an example embodiment of the invention will be described. An example of vehicles to which the invention can be applied is schematically shown in FIG. 4. Referring to FIG. 4, the vehicle has an internal combustion engine (will hereinafter be referred to as "engine") 1 serving as a drive force source and a power generator 3 driven by the torque transmitted between the engine 1 and drive wheels 2. Typical examples of the engine 1 are gasoline engines and diesel engines. That is, the engine 1 is an internal combustion engine that starts running on its own in response to fuel supply being started while it is driven at a predetermined engine speed or higher, and therefore so called "fuel-cut control" can be performed on the engine 1, as will be described later. An alternator (ALT) 3 (an example of "power generator" in the invention) and an accessory component 4 are mounted on the engine 1, and they are driven by the drive force output from the engine 1.

The alternator 3 is electrically connected to a power storage 5, which is, for example, a lead battery or a lithium-ion (Li-ion) battery, and various electric loads 6 are connected to the power storage 5. An electronic control unit (ECU) 7 controls charging and discharging of the power storage 5.

A fluid coupling is connected to the output side of the engine 1. The fluid coupling is structured to transmit drive force via a fluid. A typical example of the fluid coupling is a torque converter 8 having a known structure. The torque converter 8, referring to FIG. 4, is provided with a direct-coupling clutch (a lockup clutch) 9. A transmission 11 is connected to the output side of the torque converter 8 via a clutch 10 (clutch C1). The clutch 10 is a so-called "start clutch" that is, for example, a wet multi-plate clutch. The clutch 10 is hydraulically applied when the vehicle is driven to travel.

The transmission 11 changes its speed ratio as required to increase the torque output from the engine 1 or control the speed of the engine 1 to a speed for better fuel economy. The transmission 11 may be a typical multi-speed non-continuous automatic transmission or a typical continuously variable transmission. In the example illustrated in FIG. 4, a belt-drive continuously variable transmission is used as the transmission 11. Referring to FIG. 4, the transmission 11 is provided with a primary pulley 12 at the drive side (input side) and a secondary pulley 13 at the driven side (output side), which are arranged such that their rotation axes are parallel to each other. A belt 14 is wound on these pulleys 12 and 13. Each pulley 12 and 13 has a stationary sheave and a moveable sheave that is moved toward and away from the stationary sheave. As the moveable sheave of the primary pulley 12 is moved to change the groove width, the pitch radius of the belt 14 changes, whereby the speed ratio of the transmission 11 changes. The secondary pulley 13 is connected to a final reducer (differential) 15, and torque is transmitted to the left and right drive wheels 2 via the differential 15.

Figure 5:
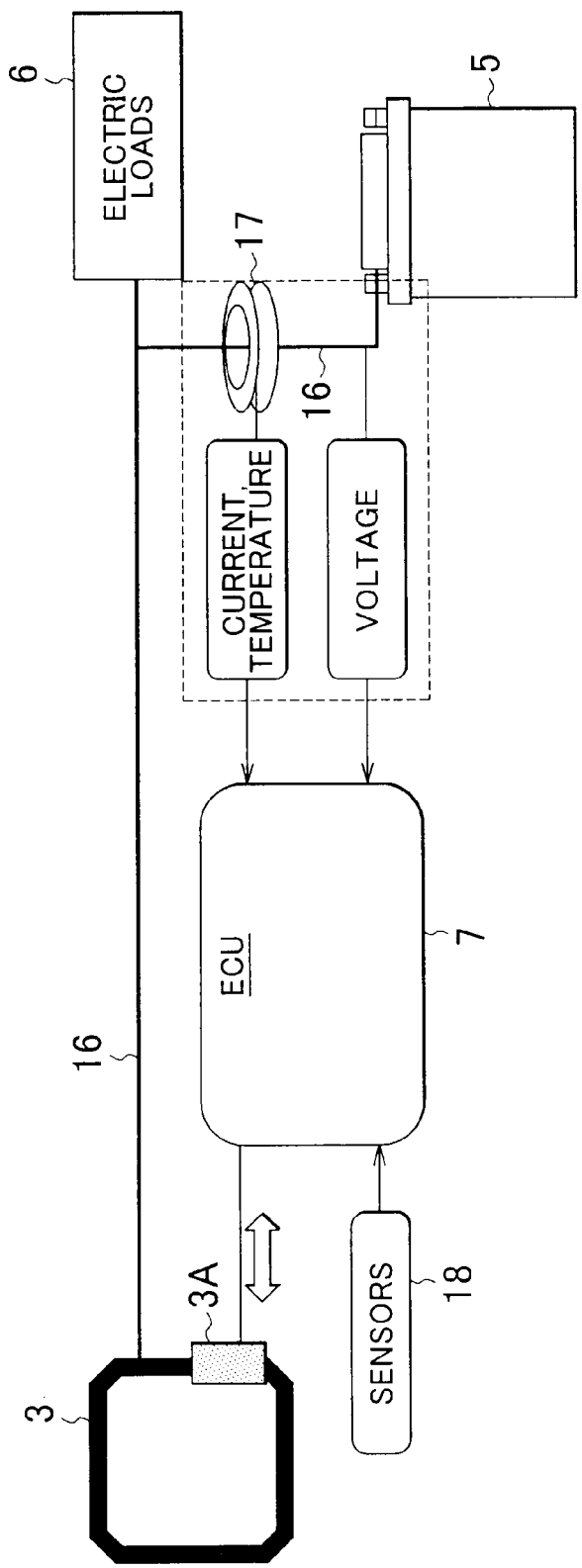
FIG. 5 is a block diagram schematically showing the configuration of a control system for controlling the alternator shown in FIG. 4.

FIG. 5 schematically illustrates the configuration of a control system for the alternator 3. A regulator 3A is provided at the alternator 3, and signals indicative of the operation state of the alternator 3 are sent from the regulator 3A to the ECU 7, and the regulator 3A sets operation conditions, including an excitation current, in accordance with control instructions from the ECU 7. Further, the alternator 3, power storage 5, and electric loads 6 are interconnected via voltage lines 16, and a sensor 17 that detects the current, temperature, and voltage and outputs corresponding signals is provided on the voltage line 16 between the power storage 5 and the electric loads 6. The signals of the sensor 17 are input to the ECU 7. Further, the ECU 7 receives from various other sensors 18 signals used in determining vehicle conditions, such as signals indicating the vehicle speed, accelerator operation amount (e.g., the travel of the accelerator pedal), speed ratio (transmission speed ratio), engine speed, signals indicating whether the lockup clutch 9 is presently applied or released, and signals indicating execution of the fuel-cut control.

A control apparatus of this example embodiment of the invention, which is incorporated in the vehicle described above, is basically adapted to minimize, when the vehicle is decelerated with the fuel supply to the engine 1 being suspended (fuel cut) and with the lockup clutch 9 being applied, a change (jerk) in the deceleration by using "power generation torque", which occurs as a result of power generation by the alternator 3, as part of "braking torque" such that the power generation torque changes as needed. When the lockup clutch 9 is released with a decrease in the vehicle speed, the power generation torque is reduced to the minimum level (substantially zero), so as to prevent generation of deceleration force unintended by the driver and/or to prevent the driver from feeling an unintended deceleration. However, when the power stored in the power storage 5 is not adequate or when the electric load is large, the power generation by the alternator 3 is required regardless of the need for controlling the braking torque during deceleration of the vehicle. In such a case, therefore, there is a possibility that the braking force or deceleration feeling be adversely affected by the power generation torque after the lockup clutch 9 is released. In order to avoid or minimize such adverse affects on the braking force or deceleration feeling, the control apparatus of the example embodiment of the invention is structured to execute the following control.

Figure 1:
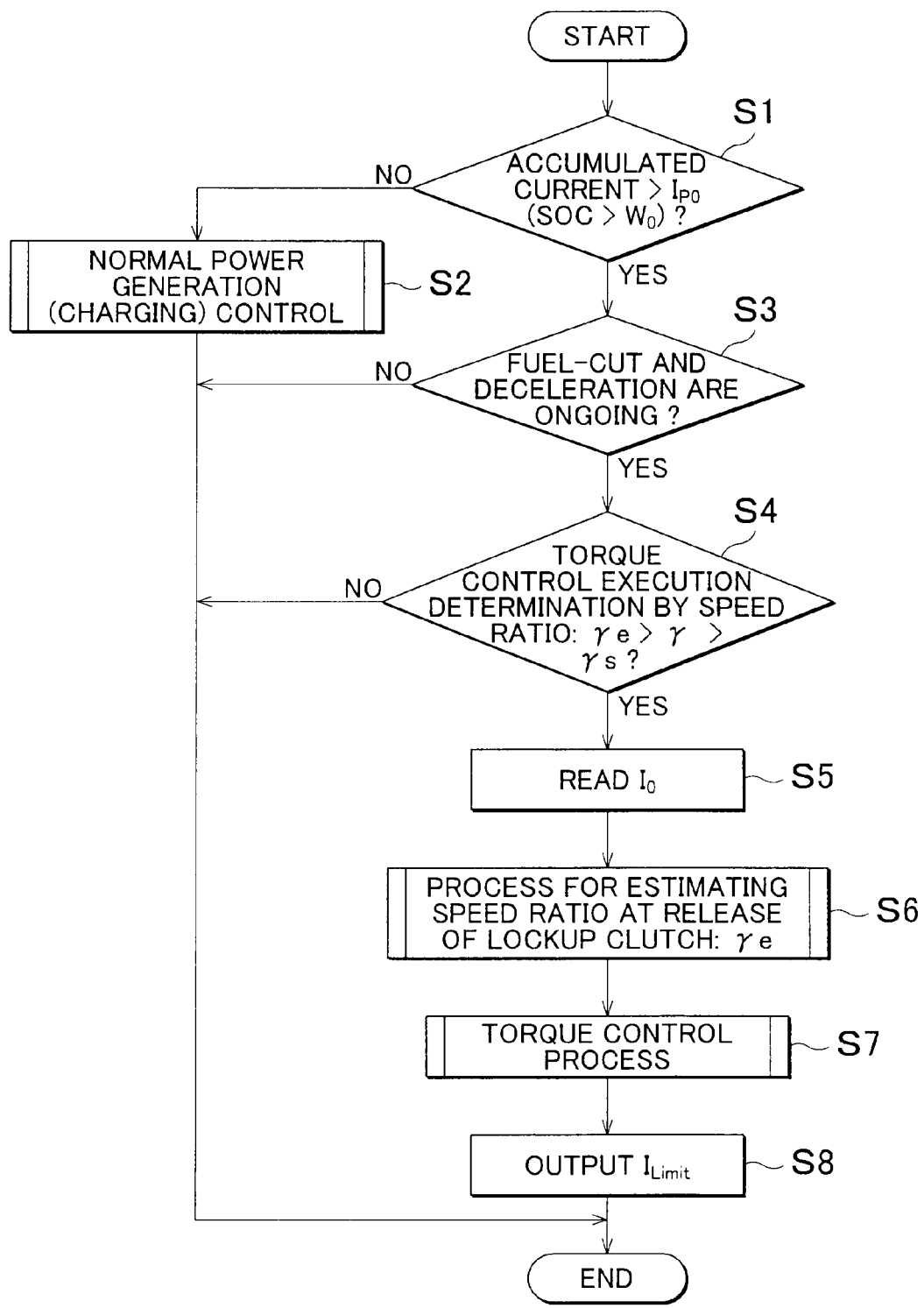
FIG. 1 is a flowchart illustrating example control executed by a control apparatus of an example embodiment of the invention.

FIG. 1 is a flowchart illustrating, by way of example, the procedure of the control executed in the example embodiment. This routine is repeated at given short time intervals. Referring to FIG. 1, first, it is determined whether an accumulated current value has exceeded a predetermined value $I_{P0}$ (step S1). The accumulated current value represents, if the power storage 5 is a lead battery, the amount of power stored in the lead battery, and it is obtained by accumulating the amount of power that is generated by the alternator 3 and then is used to charge the power storage 5 in a state where the torque (negative torque) of the alternator 3 is used as braking force during deceleration of the vehicle. Thus, the accumulation of current value is started when the deceleration control for increasing the amount of power generated by the alternator 3 is started in response to a deceleration operation, such as an accelerator pedal (not shown in the drawings) having been released, being detected while the vehicle is traveling at a predetermined speed or higher. Further, the predetermined value (threshold) $I_{P0}$ used in the above-described determination as to the accumulated current value is set such that it can be determined that the amount of power stored in the power storage 5 is large enough to allow discontinuance of the power generation when the accumulated current value is larger than the predetermined value $I_{P0}$. As such, the predetermined value $I_{P0}$ may be regarded as "minimum allowable charge level". Such a minimum allowable charge level can be calculated based on electric loads of an individual vehicle (e.g., each vehicle model), or can be determined by learning the electric load state during idling. As such, it may either be a constant or a variable that changes in time.

If the result of the determination in step S1 is negative (NO), that is, if the accumulated current value is equal to or smaller than the threshold $I_{P0}$, an instruction for executing normal power generation (charging) control, which is typical power generation (charging) control, is issued in step S2, after which the present cycle of the routine in FIG. 1 is finished. This power generation control performs power generation based on the requirement for charging the power storage 5 and/or the requirement for powering the electric loads 6. Thus, during deceleration of the vehicle, the alternator 3 is controlled in accordance with a required power generation voltage (will be referred to as "instruction voltage" where necessary), and therefore uncontrolled torque may be transmitted to the vehicle from the alternator 3 depending upon the state of the power storage 5 and/or the states of the respective electric loads 6. On the other hand, if the result of the determination in step S1 is positive (YES), that is, if the accumulated current value is larger than the threshold $I_{P0}$, it is then determined whether the vehicle is being decelerated with the fuel-cut (F/C) control for suspending the fuel supply to the engine 1 (step S3). Meanwhile, in the fuel-cut control, the lockup clutch 9 is normally applied in order to maintain the speed of the engine 1 equal to or higher than the speed at which to discontinue the fuel cut (will hereinafter be referred to as "fuel-cut discontinuance engine speed") as long as possible, and therefore the determination in step S3 may include determination as to whether the lockup clutch 9 is presently applied.

If the result of the determination in step S3 is negative (NO) due to, for example, the vehicle being accelerated or the fuel-cut control being not executed, the present cycle of the routine is finished without executing any specific control process. On the other hand, if the result of the determination in step S3 is positive (YES), that is, if the vehicle is being decelerated with the fuel-cut control during which the lockup clutch 9 is applied, it is then determined whether torque control (i.e., the control executed on the transmission 11 to increase the speed ratio) is being executed (step S4). The torque control is aimed at avoiding or minimizing a deceleration force increase caused by the speed ratio of the transmission 11 being gradually increased so as to maintain the engine speed at a desired speed or in a desired speed range. Further, in this example embodiment, the torque control includes a process of changing the torque of the alternator 3 in accordance with a change in the speed ratio of the transmission 11. As such, step S4 determines whether a present speed ratio γ is higher than a speed ratio γs that was used at a given time point immediately after the start of the deceleration with the lockup clutch 9 applied but is lower than a speed ratio γe that is estimated to be used at the end of the control. The speed ratio γ may be detected using various known methods or means. For example, the rotation speeds of the respective pulleys 12 and 13 are detected, and then the speed ratio γ is determined based on them. Note that the speed ratio γe at the end of the control will be described in detail later.

If the result of the determination in step S4 negative (NO), that is, if the torque control is not presently executed, the present cycle of the routine is finished without executing any specific control process. On the other hand, if the result of the determination in step S4 is positive (YES) due to the speed ratio γ increasing, an excitation current value (initial excitation current value: $I_0$) that was output to the alternator 3 at the time of starting the torque control for increasing the speed ratio γ is read (step S5). Then, the speed ratio γe to be used at the time of releasing the lockup clutch 9 is estimated (step S6). That is, the speed ratio γe is a target speed ratio that is to be used at the time of discontinuing the fuel-cut control to resume the fuel supply to the engine 1.

Figure 2:
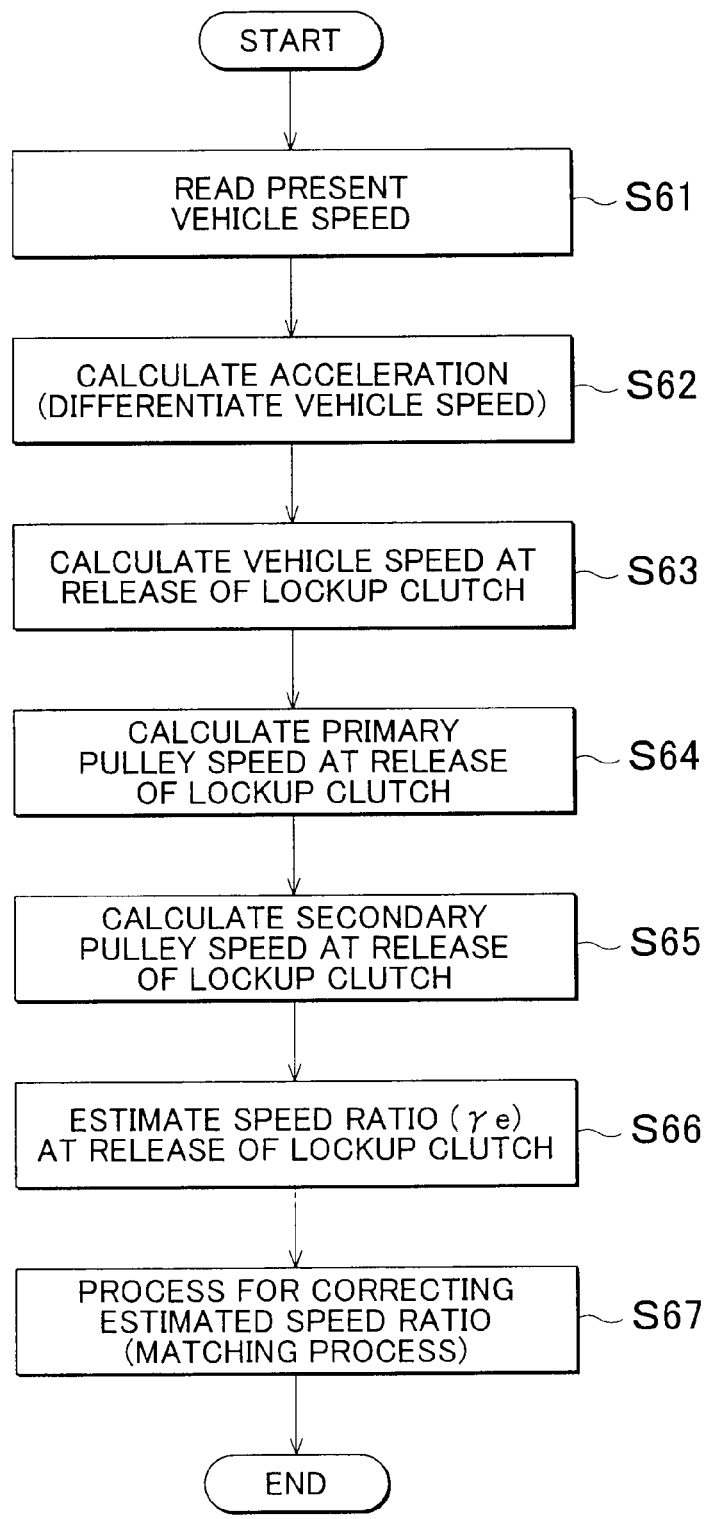
FIG. 2 is a flowchart illustrating a sub-routine executed in step S6 in the control procedure illustrated in FIG. 1.

The flowchart of FIG. 2 illustrates an example procedure for calculating the target speed ratio γe. Referring to FIG. 2, first, the present vehicle speed is determined from the signals from a sensor(s) for detecting the vehicle speed, such as a vehicle wheel speed sensor(s) (step S61). Then, the acceleration of the vehicle is calculated (step S62). More specifically, the vehicle acceleration is calculated by differentiating the vehicle speed determined in step S61. Alternatively, the vehicle acceleration may be determined based on signals from an acceleration sensor(s).

Next, the vehicle speed that will be reached at the time of releasing the lockup clutch 9 (will be referred to as "fuel-cut discontinuance vehicle speed" where necessary) is calculated (step S63). More specifically, "fuel-cut discontinuance" that resumes the fuel supply to the engine 1 is performed when the speed of the engine 1 reaches the speed at which to discontinue the fuel-cut (will hereinafter be referred to as "fuel-cut discontinuance engine speed" where necessary), and at this time, the speed ratio γ is controlled to a maximum speed ratio γmax, which corresponds to the lowest vehicle speed range. Therefore, the vehicle speed at this time, that is, the fuel-cut discontinuance vehicle speed can be calculated by dividing the fuel-cut discontinuance engine speed, at which to resume the fuel supply to the engine 1, by the maximum speed ratio γmax. The time to when the fuel-cut discontinuance vehicle speed calculated as described above is reached can be determined from the present vehicle speed and the vehicle acceleration described above. Note that the lockup clutch 9 is released before resuming the fuel supply to the engine 1. The length of time by which the releasing of the lockup clutch 9 precedes the resuming of the fuel supply may be predetermined based on a possible delay in releasing the lockup clutch 9, etc. Thus, the vehicle speed that will be reached at the time of releasing the lockup clutch 9 can be determined based on the same length of time, the vehicle acceleration described above, and the present vehicle speed.

Next, the rotation speed of the primary pulley 12 that will be reached at the time of releasing the lockup clutch 9 is calculated (step S64). This rotation speed can be determined as the speed of the engine 1, and thus the value detected by the engine speed sensor can be used. Next, the rotation speed of the secondary pulley 13 that will be reached at the time of releasing the lockup clutch 9 is calculated (step S65). Because the secondary pulley 13 is connected to the drive wheels 2 via the differential 15, etc., the rotation speed of the secondary pulley 13 that will be reached at the time of releasing the lockup clutch 9 can be calculated from the wheel rotation speed that will be reached at the time of releasing the lockup clutch 9, which can be calculated from the vehicle speed calculated in step S63, and the reduction ratio between the secondary pulley 13 and the drive wheels 2.

The speed ratio is the ratio between the rotation speed of the primary pulley 12 and that of the secondary pulley 13. Next, therefore, the speed ratio γe that will be used at the time of releasing the lockup clutch 9 is estimated based on the rotation speeds of the primary pulley 12 and secondary pulley 13, calculated as described above (step S66). The speed ratio γe that will be used at the time of releasing the lockup clutch 9 is corrected to factor in the vehicle characteristics that differ from vehicle to vehicle (step S67). This correction may be performed as needed based on, for example, the characteristics required of the vehicle and its design specification, or data obtained from simulations or actual drive. Further, the correction may be performed using a given coefficient(s), or the like. In this way, in step S6 of the routine illustrated in FIG. 1, the speed ratio γe is estimated through the procedure shown in FIG. 2.

Referring back to FIG. 1, since the control apparatus of the example embodiment of the invention controls the braking force for deceleration using the torque of the alternator 3, the torque control is executed according to the above-described change in the speed ratio (step S7). More specifically, at this time, a control instruction value is calculated which controls the torque of the alternator 3 so as to reduce a change in the jerk (i.e., so as to achieve a so-called "constant jerk") that occurs in response to the vehicle acceleration changing toward the negative side (i.e., in response to the deceleration force increasing) as the speed ratio is increased to maintain the engine speed at a desired speed or in a desired speed range. The torque of the alternator 3 as described above changes depending upon the excitation current. In step S7, therefore, an excitation current control instruction value $I_{Limit}$ is calculated using the equation indicated below. Note that the alternator 3 that operates according to such a control instruction value may be, for example, an LIN (Local Interconnect Network) alternator that can be controlled using either an excitation current value (I) or an instruction voltage value.

$$I_{Limit} = I_0 \times (\gamma e - \gamma)/(\gamma e - \gamma s)$$

Next, the ECU 7 outputs, as a control instruction signal, the excitation current control instruction value $I_{Limit}$ calculated in step S7 to the alternator 3 (step S8).

Figure 3:
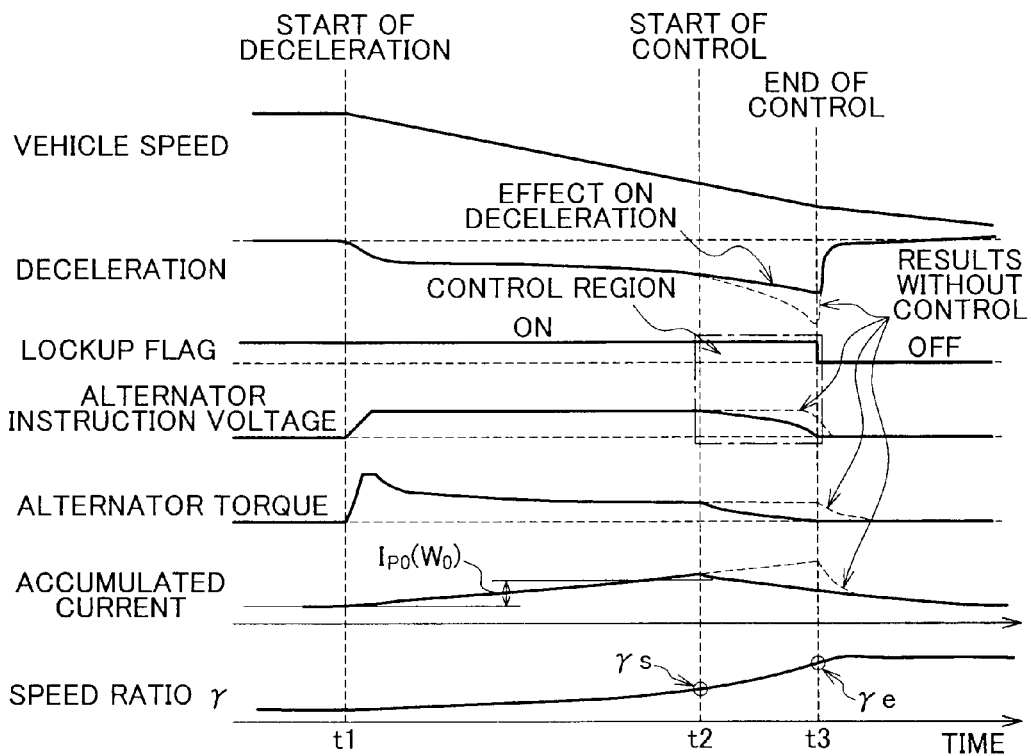
FIG. 3 is a time chart illustrating how the deceleration, alternator torque, etc. change during the control illustrated in FIGS. 1 and 2.

The time chart in FIG. 3 illustrates how the deceleration, the torque of the alternator 3, etc. change when the control procedures illustrated in FIGS. 1 and 2 are executed. Referring to FIG. 3, when the driver performs an operation for decelerating the vehicle (e.g., releasing the accelerator pedal while the vehicle is traveling at a given speed) (time $t_1$), the instruction voltage for the alternator 3 is increased so that the alternator 3 produces braking force, that is, so that the torque produced by the alternator 3 gradually increases. Further, at the same time, the current generated by the alternator 3 (i.e., the power used for charging the power storage 5) starts to be accumulated. Note that "the torque of the alternator 3" represents the torque used for the power generation by the alternator 3, and thus it is a load on the engine 1, acting as braking force on the vehicle. As the torque used for the power generation acts as braking force, the deceleration increases, so that the vehicle speed gradually decreases.

As the alternator 3 continues to generate power in the course of such deceleration, the accumulated current value gradually increases and then exceeds the threshold $I_{P0}$, satisfying the condition for executing the torque control using the alternator 3. Thus, at this time, the torque control using the alternator 3 is started (time $t_2$), starting to reduce the instruction voltage for the alternator 3. Further, the speed ratio γs at this time is read, and the speed ratio γe that will be used at the end of the control is estimated, and the excitation current control instruction value $I_{Limit}$ is set based on the speed ratios γs and γe and the initial excitation current value $I_0$ and then output. Since the excitation current control instruction value $I_{limit}$ is set based on the speed ratio that is increased so as to maintain the engine speed as described above, the torque produced by the alternator 3 gradually decreases. Therefore, the increase in the braking force that results from the increase in the speed ratio is completely, or partially, offset by the decrease in the torque of the alternator 3, whereby the deceleration (or the rate of change in the deceleration) is maintained at a substantially constant level. That is, "constant jerk" is achieved, resulting in better driveability.

Then, in response to the actual speed ratio γ increasing up to the speed ratio γe as described above (time $t_3$), a lockup (L/U) flag is set to "OFF", and an instruction signal for releasing the lockup clutch 9 is output. At this time, the instruction voltage for the alternator 3 is zero, that is, no torque is produced by the alternator 3 (i.e., no torque is consumed by the alternator 3). This is because the accumulated current value at this time is already larger than the threshold $I_{P0}$ and thus the power generation for the power storage 5 and the electric loads 6 is not necessary. Thus, since the torque produced by the alternator 3 is reduced to zero as described above, the deceleration at the time of releasing the lockup clutch 9 is not large. Accordingly, when the negative torque applied to the drive wheels 2 from the engine 1 side decreases as a result of the lockup clutch 9 having been released, such a change in the torque does cause any shock or causes only a small shock, resulting in better driveability. Further, torque control such as the one described above can be executed using an alternator having a typical voltage specification, as well as an LIN alternator, and therefore it can be executed in various vehicles to provide better driveability. According to the above-described control executed by the control apparatus of the example embodiment of the invention, further, the vehicle speed at which to release the lockup clutch 9 when the vehicle is decelerating with the fuel-cut control does not need to be high, and therefore the duration of the fuel-cut control can be extended, resulting in improved fuel economy.

For comparison, the time chart in FIG. 3 also illustrates, using broken lines, an example case where the control for reducing the torque of the alternator 3 in accordance with an increase in the speed ratio is not executed, that is, the above-described control of the control apparatus of the example embodiment of the invention is not executed. Referring to FIG. 3, in a case where the torque of the alternator 3 is maintained until the lockup clutch 9 is released, the deceleration becomes large, and therefore the torque largely changes in response to the lockup clutch 9 being released, resulting in the driver feeling "shock". Further, although not shown in FIG. 3, in a situation where the accumulated current value has not yet reached the threshold $I_{P0}$ due to the requirement for power generation for the power storage 5 and the electric loads 6, in some cases, the alternator 3 is operated under normal power generation control, and therefore the alternator 3 produces negative torque even in a period of time immediately before the lockup clutch 9 is released, possibly resulting in a deceleration feeling unintended by the driver, and causing a possibility that the negative torque produced through the power generation by the alternator 3 after the lockup clutch 9 is released act on the engine 1 to cause an undesirable decrease in the engine speed.

As described above, one of factors restricting the torque control that is executed using a power generator when the vehicle is decelerated with the fuel-cut control is a shortage of the accumulated current value, that is, a requirement for continuing the power generation. Therefore, the determination process in step S1 of the routine illustrated in FIG. 1 may be replaced with a determination process that determines whether power generation for the power storage 5 and the electric loads 6 is required, using a parameter(s) other than the accumulated current value. For example, in a case where the above-described control is executed in a vehicle provided with a Li-ion battery, rather than a lead battery, it is determined in step S1 whether the present SOC (State Of Charge) has exceeded a predetermined reference value $W_0$ as indicated in the parentheses in FIG. 1 (step S1). If the result of the determination in step S1 is negative (NO), the control proceeds to step S2. Conversely, if the result of the determination in step S1 is positive (YES), the control proceeds to step S3. In this case, as indicated in the parentheses in FIG. 3, after the SOC exceeds the reference value $W_0$ in the time period from time $t_1$ to time $t_2$, the subsequent control processes are executed, so that various changes, such as those illustrated in FIG. 3, occur. Accordingly, this control, which permits execution of the torque control using the power generator on the condition that the SOC has exceeded the reference value, provides effects and advantages that are the same as or similar to those obtained with the former control using the accumulated current value and referring to FIG. 1 to FIG. 3.

While the control procedure for controlling deceleration or braking torque using the torque of the power generator is not executed when a factor(s) restricting the torque of the power generator is in effect in the foregoing examples, it is to be understood that the invention is not limited to any of the foregoing examples. That is, for example, a control apparatus according to the invention may be structured to make the ratio of the braking torque to be covered by the power generator lower when a factor(s) restricting the torque of the power generator is in effect than when the factor(s) is not in effect, or it may be structured to limit the duration of the torque control using the power generator, by, for example, discontinuing the torque control before the lockup clutch is released. That is, control apparatuses according to the invention may incorporate various other structures and arrangements, provided that the manner of the torque control using the power generator is different between when the factor(s) restricting the torque of the power generator is in effect and when it is not in effect. Power generators applicable to the invention are not limited to an alternator mounted on an engine, but they also include various other power generators that are connected to a drive force transfer path from the engine to the drive wheels.

What is claimed is:

1. A vehicle control apparatus comprising:
a power generator driven by a torque transmitted between an internal combustion engine and a drive wheel, wherein
the vehicle control apparatus executes a torque control that smoothly changes a torque at the drive wheel by changing a torque of the power generator during deceleration of the vehicle, wherein the vehicle control apparatus determines whether a factor restricting the torque of the power generator is in effect during the deceleration of the vehicle, and controls a manner of the torque control to be different between when the restricting factor is in effect and when the restricting factor is not in effect, and
wherein the torque control is executed when a state of a lockup clutch of a fluid coupling provided between the internal combustion engine and the drive wheel is changed from an applied state to a released state.

2. The vehicle control apparatus according to claim 1, wherein the determination as to whether the restricting factor is in effect includes a determination as to whether the power generator is required to continue power generation.

3. The vehicle control apparatus according to claim 2, wherein the determination as to whether the power generator is required to continue the power generation is based on an accumulated value of current generated through the power generation or an amount of power stored in a power storage connected to the power generator.

4. The vehicle control apparatus according to claim 1, wherein the vehicle control apparatus does not execute the torque control when the restricting factor is in effect and executes the torque control when the restricting factor is not in effect.

5. A method for controlling a vehicle having a power generator driven by a torque transmitted between an internal combustion engine and a drive wheel, comprising:
   executing a torque control that smoothly changes a torque at the drive wheel by changing a torque of the power generator during deceleration of the vehicle, wherein whether a factor restricting the torque of the power generator is in effect during the deceleration of the vehicle is determined, and a manner of the torque control is controlled to be different between when the restricting factor is in effect and when the restricting factor is not in effect,
   wherein the torque control is executed when a state of a lockup clutch of a fluid coupling provided between the internal combustion engine and the drive wheel is changed from an applied state to a released state.

\* \* \* \* \*